US012293082B2

(12) United States Patent
Shibayama et al.

(10) Patent No.: US 12,293,082 B2
(45) Date of Patent: May 6, 2025

(54) COMPUTER SYSTEM

(71) Applicant: Hitachi, Ltd., Tokyo (JP)

(72) Inventors: Tsukasa Shibayama, Tokyo (JP);
Akira Deguchi, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 0 days.

(21) Appl. No.: 18/458,288

(22) Filed: Aug. 30, 2023

(65) Prior Publication Data

US 2024/0361909 A1 Oct. 31, 2024

(30) Foreign Application Priority Data

Apr. 27, 2023 (JP) .................................. 2023-073056

(51) Int. Cl.
*G06F 3/06* (2006.01)
(52) U.S. Cl.
CPC ............ *G06F 3/061* (2013.01); *G06F 3/0644* (2013.01); *G06F 3/067* (2013.01)
(58) Field of Classification Search
CPC ......... G06F 3/061; G06F 3/0644; G06F 3/067
See application file for complete search history.

(56) References Cited

U.S. PATENT DOCUMENTS

| 2004/0267829 | A1 | 12/2004 | Hirakawa et al. |
| 2015/0186043 | A1* | 7/2015 | Kesselman ............. G06F 3/067 711/162 |
| 2021/0042049 | A1* | 2/2021 | Mulholland ............ G06F 3/067 |
| 2021/0240351 | A1* | 8/2021 | Yokoi ................. G06F 11/2038 |
| 2022/0317898 | A1* | 10/2022 | O'Halloran ........... G06F 3/0689 |

FOREIGN PATENT DOCUMENTS

JP 2005-018506 A 1/2005

* cited by examiner

*Primary Examiner* — Masud K Khan
(74) *Attorney, Agent, or Firm* — Volpe Koenig

(57) ABSTRACT

Provided is a computer system capable of maintaining a storage capacity allocated to a journal volume within an appropriate range during an application period of remote copy. A first storage system includes a primary volume and a primary journal volume, and a second storage system includes a secondary volume and a secondary journal volume. A management computer is configured to manage the remote copy in which a primary volume, a primary journal volume, a secondary journal volume, and a secondary volume are paired, and expand and/or release a capacity of the primary journal volume and/or the secondary journal volume according to operation information of a resource related to the remote copy.

10 Claims, 17 Drawing Sheets

FIG. 6A
312

| RESOURCE ID | CAPACITY | ATTRIBUTE |
|---|---|---|
| V1 | 100GB | Normal |
| V2 | 200GB | Normal |
| V3 | 1TB | Journal |
| ... | ... | |

FIG. 6B
314

| RESOURCE ID | VOL ID | JVOL CAPACITY | Status | USAGE RATE |
|---|---|---|---|---|
| J1 | V3 | 1TB | Normal | 70% |
| J2 | V7 | 2TB | Normal | 20% |
| ... | ... | | | |

FIG. 6C
316

| RESOURCE ID | PVOL ID | PJNL ID | SVOL ID | SJNL ID | Group ID | Status |
|---|---|---|---|---|---|---|
| Rep1 | V1 | J2 | V2 | J21 | G1 | pair |
| Rep2 | V5 | J6 | V6 | J61 | G1 | suspend |
| ... | | | | | | |

| VOL ID | METRIC | TIME | VALUE |
|---|---|---|---|
| V1 | IOPS | 10:00:00 | 500 |
| | | 10:01:00 | 600 |
| | | ... | |
| | DATA TRANSFER RATE | 10:00:00 | 50 |
| | | 10:01:00 | 55 |
| | | ... | |
| ... | ... | | |

| PJNL ID | SJNL ID | METRIC | TIME | VALUE |
|---|---|---|---|---|
| J2 | J21 | DATA TRANSFER RATE | 10:00:00 | 500 |
| | | | 10:01:00 | 550 |
| | | | ... | |
| ... | | ... | | |

| ID | METRIC | TIME | VALUE |
|---|---|---|---|
| CPU1 | CPU USAGE RATE | 10:00:00 | 20 |
| | | 10:01:00 | 25 |
| | | ... | |
| CPU2 | ... | | |
| Memory | MEMORY WRITE PENDING RATE | 10:00:00 | 10 |
| | | 10:01:00 | 20 |
| | | ... | |

| RESOURCE ID | PVOL ID | PJNL ID | SVOL ID | SJNL ID | Group ID | Status |
|---|---|---|---|---|---|---|
| Rep1 | V1 | J2 | V2 | J21 | G1 | pair |
| Rep2 | V5 | J6 | V6 | J61 | G1 | suspend |
| ... | | | | | | |

| RESOURCE ID | VOL ID | JVOL CAPACITY | Status | USAGE RATE |
|---|---|---|---|---|
| J1 | V3 | 1TB | Normal | 70% |
| J2 | V7 | 2TB | Error | 20% |
| ... | ... | | | |
| ... | ... | | | |

| TIME | OPERATION | OPERATION TYPE | OPERATION PAIR RESOURCE | DESIGNATED PARAMETER |
|---|---|---|---|---|
| 10.00.00 | Get Volume | GET | V1 | - |
| 10.00.10 | Create Volume | SET | APPARATUS 1 | 100 |
| 10.01.00 | Create Snapshot | SET | V2 | - |
| ... | | | | |

| RESOURCE ID | TIME | USAGE RATE |
|---|---|---|
| PJNL1 | 10:00:00 | 60% |
| | 10:01:00 | 62% |
| | 10:02:00 | 63% |
| | ... | |
| PJNL2 | | 20% |
| ... | | |
| ... | | |

| PJNL ID | SJNL ID | METRIC | TIME | TRANSFER RATE |
|---|---|---|---|---|
| J2 | J21 | DATA TRANSFER RATE | 10:00:00 | 500 |
| | | | 10:01:00 | 550 |
| | | | 10:02:00 | 400 |
| | | | ... | |
| ... | | ... | | |

| DKCID | RELATED RESOURCE ID | METRIC | RELATED RESOURCE ID | TENDENCY VALUE |
|---|---|---|---|---|
| DKC1 | CPU1 | CPU USAGE RATE | - | 35 |
| | Memory | MEMORY WRITE PENDING RATE | - | 25 |
| | J2 | VOL IOPS | V3 | 650 |
| | | VOL DATA TRANSFER RATE | - | 50 |
| | | INTER-JNL DATA TRANSFER RATE | J21 | 500 |
| | | ... | | |
| | J4 | | | |
| | ... | | | |

| PJNLVOL IOPS | LOAD OF PRIMARY DKC | INTER-JNL NW STATE | LOAD OF SECONDARY DKC | HANDLING |
|---|---|---|---|---|
| CONSTANT | NORMAL | NORMAL | NORMAL | PERFORM TRANSFERRED CHECK AND PAGE RELEASE |
| | | | HIGH LOAD | CHECK THRESHOLD VALUE OF USAGE RATE OF P/SJNLVOL |
| | | PERFORMANCE DETERIORATION | NORMAL | CHECK THRESHOLD VALUE OF USAGE RATE OF PJNLVOL |
| | | | HIGH LOAD | CHECK THRESHOLD VALUE OF USAGE RATE OF P/SJNLVOL |
| | ... | | | |
| INCREASE | NORMAL | NORMAL | NORMAL | NOTHING |
| | | | HIGH LOAD | CHECK THRESHOLD VALUE OF USAGE RATE OF SJNLVOL |
| | | EXCEED UPPER LIMIT | NORMAL | CHECK THRESHOLD VALUE OF USAGE RATE OF PJNLVOL |
| | | | HIGH LOAD | CHECK THRESHOLD VALUE OF USAGE RATE OF P/SJNLVOL |
| | ... | | | |
| DECREASE | NORMAL | NORMAL | NORMAL | PERFORM TRANSFERRED CHECK AND PAGE RELEASE |
| | | | HIGH LOAD | CHECK THRESHOLD VALUE OF USAGE RATE OF SJNLVOL, AND PERFORM TRANSFERRED CHECK AND PAGE RELEASE IF NO INCREASING TENDENCY |
| | ... | | | |

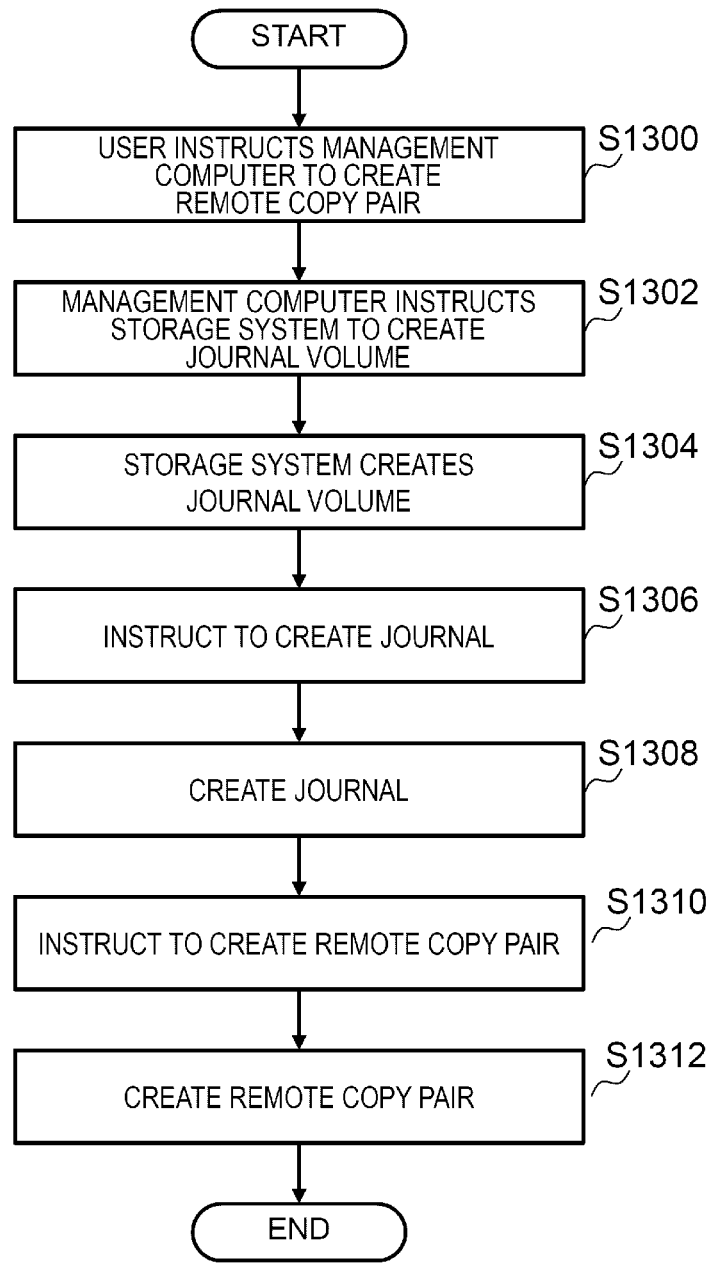

COMPUTER SYSTEM

BACKGROUND OF THE INVENTION

1. Field of the Invention

The present invention relates to a computer system for remote copy.

2. Description of Related Art

Remote copy is used in an application form of a hybrid cloud in which on-premises software and a cloud are combined. A storage system described in JP2005-18506A is known as the remote copy.

In a computer system for the remote copy, update data written from a host server to a primary volume of a primary site (business site) is copied to a journal volume (master journal volume) and stored. The data is copied to a journal volume (restore journal volume) of a secondary site (backup site) asynchronously with an I/O of the primary volume.

In this way, the data written from the host to the primary volume of the primary site is transferred to the secondary site asynchronously with a write request. The remote copy is completed by writing the data from the restore journal volume to the secondary volume.

SUMMARY OF THE INVENTION

An optimum size of a journal volume is estimated based on an IO load for a primary volume, a network band for connecting a primary site and a secondary site, stability of a network, and the like. However, it is difficult for an administrator of a storage system to determine an appropriate size of the journal volume.

In an initial design stage of a journal group (JNL), it is difficult to correctly grasp a maximum write amount of an IO load, worst line status, and the like in actual application in advance. In the first place, network instantaneous interruption between the primary site and the secondary site and temporary transfer degradation due to circumstances of a network operator may occur.

Once a block having a predetermined storage capacity is allocated to the journal volume, the block remains allocated to the journal volume, and a capacity thereof is not recovered. On the other hand, since the initial design is difficult, when a large capacity is first allocated to the journal volume, a write page of IO is allocated to the journal volume even in a temporary transfer rate deterioration state such as the network instantaneous interruption, and the capacity of the journal volume is uselessly consumed.

The journal volume is first created with an appropriate capacity, and the capacity is then expanded as needed. It is preferable that an unnecessary excessive capacity is released from the journal volume and used effectively. An object of the present invention is to provide a computer system capable of maintaining a storage capacity allocated to a journal volume within an appropriate range during an application period of remote copy, and a method thereof.

In order to achieve the above object, the present invention provides a computer system including a first storage system constituting a primary site, a second storage system constituting a secondary site, and a management computer. The first storage system includes a primary volume and a primary journal volume, the second storage system includes a secondary volume and a secondary journal volume. The management computer is configured to manage remote copy in which the primary volume, the primary journal volume, the secondary journal volume, and the secondary volume are paired, and expand or release a capacity of the primary journal volume and/or the secondary journal volume according to operation information of a resource related to the remote copy.

In order to achieve the above object, the present invention further provides a storage system control method in which a management computer manages remote copy between a first storage system constituting a primary site and a second storage system constituting a secondary site. The management computer is configured to dynamically expand or release a capacity of a journal volume according to operation information of a resource related to application of the remote copy.

According to the present invention, a storage capacity allocated to a journal volume can be maintained within an appropriate range during an application period of remote copy.

BRIEF DESCRIPTION OF THE DRAWINGS

FIG. 6A is an example of a volume management table.

FIG. 6B is an example of a journal management table.

FIG. 6C is an example of a pair management table.

FIG. 7A is an example of a volume operation information management table.

FIG. 7B is an example of an inter-journal operation information management table.

FIG. 7C is an example of an operation information management table of the storage system.

FIG. 8A is an example of a pair configuration management table.

FIG. 8B is an example of a primary and secondary journal configuration management table.

FIG. 9 is an example of an operation log executed on the storage system.

FIG. 10A is an example of a primary and secondary journal usage rate history management table.

FIG. 10B is an example of an inter-journal operation information history management table.

FIG. 11 is an example of a determination history tendency management table.

FIG. 12 is an example of a determination map.

FIG. 13 is a flowchart for creating the journal volume.

DESCRIPTION OF EMBODIMENTS

Figure 1:
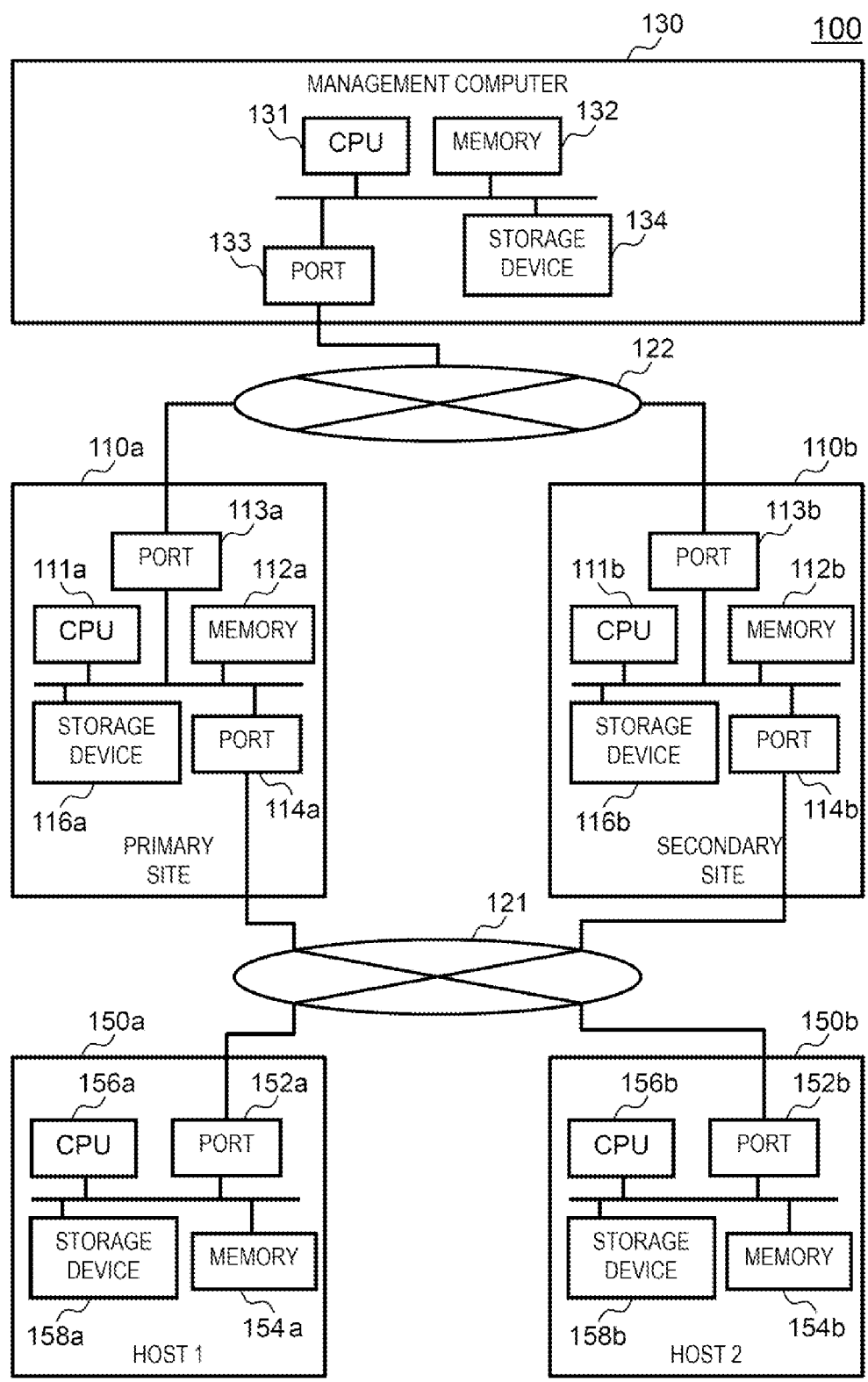
FIG. 1 is a block diagram illustrating a configuration of a computer according to an embodiment of the present invention.

Hereinafter, an embodiment of the present invention will be described with reference to the drawings. For clarity of description, the following description and drawings may be omitted or simplified as appropriate. The present invention is not limited to the present embodiment, and all embodiments corresponding to ideas of the present invention are included in a technical scope of the present invention. Unless otherwise limited, each component may be plural or singular.

In the following description, various kinds of information are described in an expression of "xxx table", and the various kinds of information may be expressed with a data structure other than the table. In order to indicate that the various kinds of information do not depend on the data structure, "xxx table" may be referred to as "xxx information".

In the following description, when the same kind of elements are described without distinction, a reference numeral (or a common part in the reference numeral) is used, and when the same kind of elements are separately described, an ID of an element (or a reference numeral of the element) may be used.

In the following description, a "computer system" is a system including one or more computers. Therefore, the "computer system" may be one computer, a plurality of computers, or in addition to the computer, may include a device other than the computer. The one or more computers typically include at least one physical computer. The one or more computers may include at least one virtual computer.

In the following description, a "storage management apparatus" may include one or more computers. Specifically, for example, when a management computer includes a table display device and the management computer displays information on its own table display device with tables, the management computer may be a management system.

For example, when the management computer (for example, a server) transmits table display information to a remote table display computer (for example, a client) and the table display computer displays the information with tables (when the management computer displays the information on the table display computer with tables), a system including at least the management computer among the management computer and the table display computer may be the storage management apparatus.

In the following description, processing may be explained with a "program" or a process thereof as a subject, since the program is executed by a processor or a controller (for example, a CPU) to perform determined processing while appropriately using a storage resource (for example, a memory) and/or a communication interface apparatus (for example, a communication port), the subject of the processing may be the processor. The processor operates as a functional unit that implements a predetermined function by operating according to a program. An apparatus and a system including the processor are an apparatus and a system including the functional unit.

In the following description, a "storage device" may be, for example, an HDD or an SSD. Different kinds of devices may coexist in a storage system.

FIG. 1 is a block diagram illustrating a configuration of a computer system 100 according to an embodiment of the present invention. The computer system 100 includes a storage system 110a and a storage system 110b. Since asynchronous remote copy is applied between these storage systems, the storage system 110a is referred to as a primary storage system, and the storage system 110b is referred to as a secondary storage system. The computer system 100 further includes a management computer 130, a host 150a (host 1), and a host 150b (host 2).

The storage system 110a (110b) includes a storage device 116a (116b), which is a data storage apparatus, a port 113a (113b) for connecting to a management network 122 to which the management computer 130 is connected, a memory 112a (112b), and a processor 111a (111b) connected to the above elements.

The storage system 110a (110b) further includes a port 114a (114b) for connecting to a storage network 121 to which the host 150a (host 1) and the host 150b (host 2) are connected.

The port 114a (port 114b) performs interface processing of data input and output between the storage system 110a (110b) and the host 110a (110b), and may be, for example, an HBA.

The port 113a (113b) performs interface processing of data input and output between the storage system 110a (110b) and the management computer 130, and may be, for example, a NIC. The networks 121 and 122 may be, for example, FCSANS.

The storage system 110a (110b) provides one or more logical volumes capable of reading and writing data to the host 150a (150b). The storage system 110a (110b) receives an I/O command (for example, a write command or a read command) designating a logical volume from the host 150a (150b), and processes the I/O command.

The storage system 110a (110b) reads and writes data at an address position designated by the write command or the read command in the designated logical volume according to the write command or the read command input from the host 150a (150b).

The storage system may include one server (node), or a plurality of servers (nodes) may be regarded as one cluster and clusters of the plurality of servers may be regarded as one storage system. The management computer, the storage system, and the host may be operated on a physical/virtual server in an on-premises data center. The management computer, the storage system, and the host may be operated in a cloud environment provided by a public cloud. The storage device may be a physical HDD, SSD, and the like in a case of on-premises software. In a case of a public cloud, the storage device may be a virtual device (AWS such as EBS, S3, and the like) provided by a public cloud vendor. The management computer may be included in the storage system.

The management computer 130 includes a port 133 connected to the network 122, a storage device 134, a memory 132, and a processor 131 connected to the above elements. The port 133 performs the interface processing of the data input and output between the management computer 130 and the storage system 110a (110b).

The processor 131 executes predetermined processing using various programs and data stored in the memory 132 or the storage device 134 to control operation of the port 133 and perform overall control of the entire management computer 130. The management computer 130 manages the logical volumes provided to the storage system 110a (110b) and the host 150a (150b).

The host 150a (150b) includes a port 152a (152b) connected to the network 121, a storage device 158a (158b), a memory 154a (154b), and a processor 156a (156b) connected to the above elements. The port 152a (152b) performs interface processing of data input and output to or from the storage system 110a (110b). The processor 156a (156b) executes predetermined processing using various programs and data stored in the memory 154a (154b) and the storage device 158a (158b) to control operation of the port 152a (152b) and perform overall control.

Figure 2:
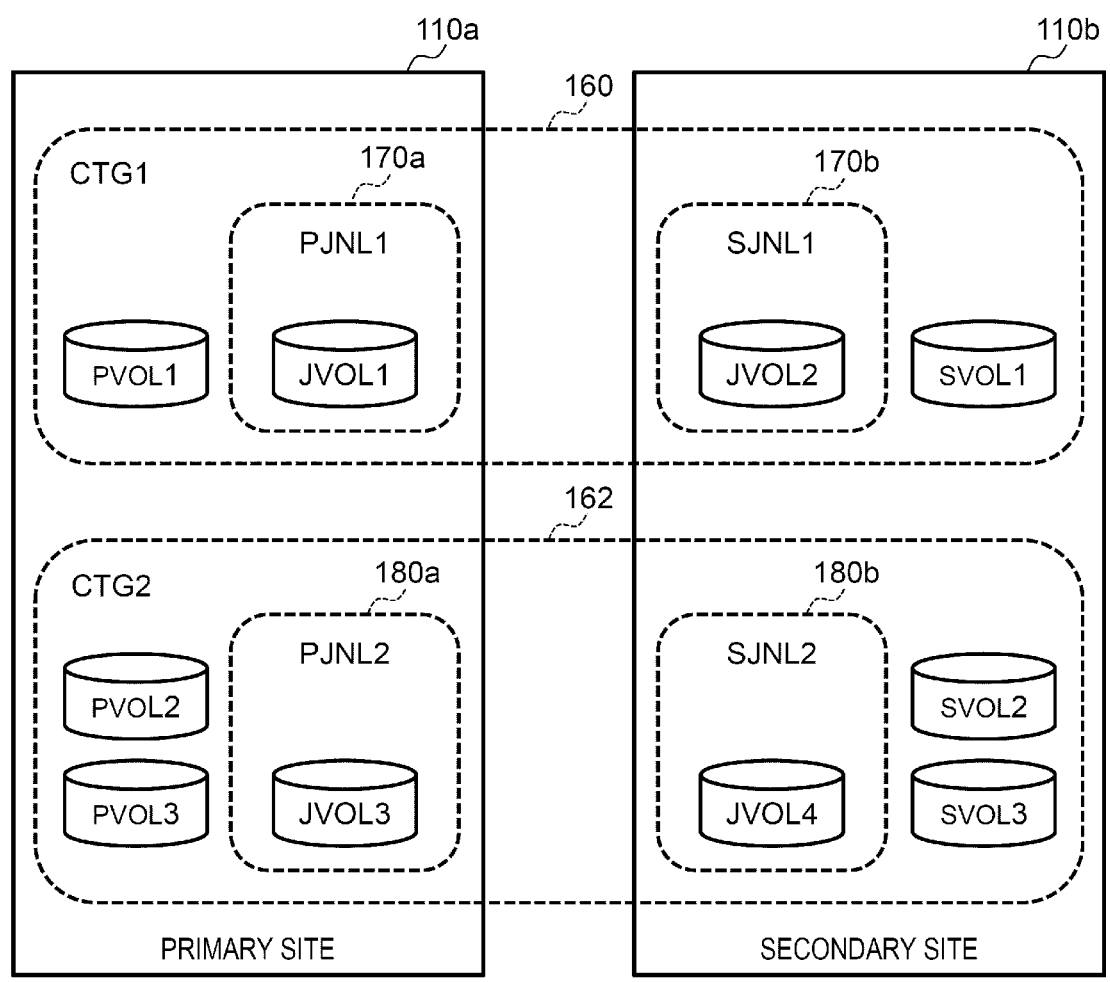
FIG. 2 is a functional block diagram of asynchronous remote copy of a computer system in FIG. 1.

FIG. 2 is a functional block diagram of the asynchronous remote copy performed between the primary storage system 110a of a primary site and the secondary storage system 110b of a secondary site. The asynchronous remote copy is a function of transferring, to a storage system of a backup site (a secondary site), data written from a host to a storage system of a business site (a primary site) asynchronously with a write request.

A first remote copy pair including a first consistency group (CTG1) 160 and a second remote copy pair including a second consistency group (CTG2) 162 are set in a remote copy system including the primary site 110a and the secondary site 110b.

A primary volume PVOL1 and a (master) journal PJNL1 (170a) are set in the primary site 110a of the first consistency group (CTG1) 160. The journal is also referred to as a journal group. The journal PJNL1 (170a) includes a (master) journal volume (JVOL1).

A secondary volume SVOL1 and a (restore) journal SJNL1 (170b) are set in the secondary site 110b of the CTG1 (160). The journal PJNL1 (170b) includes a (restore) journal volume (JVOL2).

Update data written from the host 150a (150b) to the primary volume (PVOL1) is copied and stored in the primary journal volume (JVOL1). Update data (journal data) of the journal volume (JVOL1) is copied to the secondary journal volume (JVOL2) of the secondary site 110b asynchronously with I/O to the primary volume (PVOL).

Update data of the secondary journal volume (JVOL2) is written to the secondary volume (SVOL1) of the secondary site 110b. A remote copy pair of the PVOL1-JVOL1-JVOL2-SVOL1 is set in the CTG1.

A primary volume (PVOL2, PVOL3) and a primary journal PJNL2 (180a) are set in the primary site 110a of the second consistency group (CTG2) 162. The primary journal PJNL2 includes a primary journal volume (JVOL3).

Then, a secondary volume (SVOL2, SVOL3) and a secondary journal SJNL2 (180b) are set in the secondary site 110b of the CTG2 (162). The secondary journal SJNL2 includes a secondary journal volume JVOL4. A remote copy pair of the PVOL2-JVOL3-JVOL4-SVOL2 and a remote copy pair of the PVOL3-JVOL3-JVOL4-SVOL3 are set in the CTG2.

Figure 3:
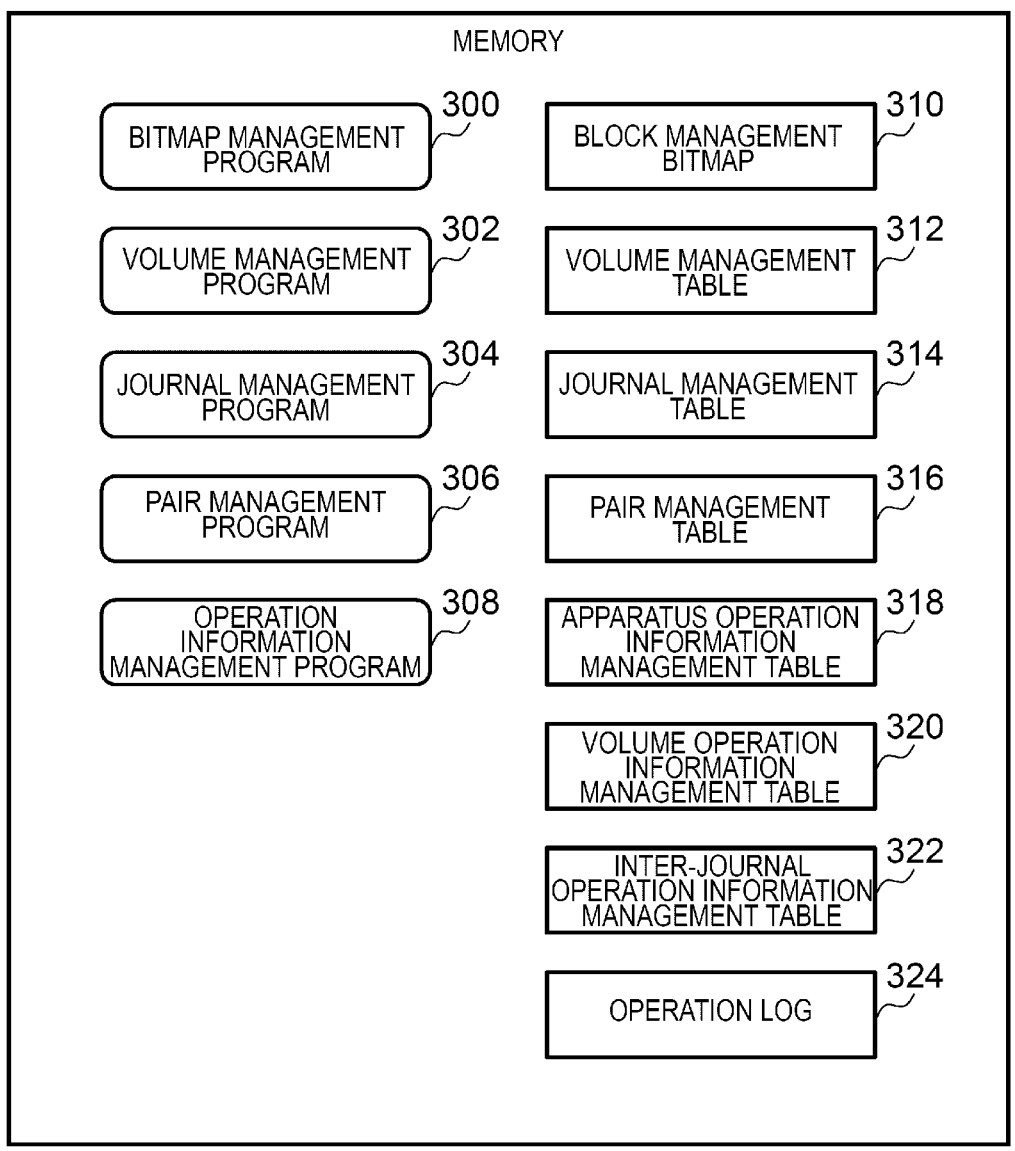
FIG. 3 is a block diagram of a storage structure of a storage system.

FIG. 3 is a functional block diagram of a storage structure of the memory 112a (112b) of the storage system 110a (110b). A bitmap management program 300 is a program for managing a bitmap (FIG. 5) of a journal volume. A volume management program 302 is a program for managing configurations such as creation, deletion, and the like of a volume.

A journal management program 304 is a program for managing creation, deletion, and the like of each of the journal and the journal volume. A pair management program 306 is a program for managing such as creation, deletion and the like of a volume pair.

An operation information management program 308 is a program for measuring, storing, and managing operation information of a CPU, a volume, and the like, which are resources (hardware and software) related to the application of the remote copy.

Figure 5:
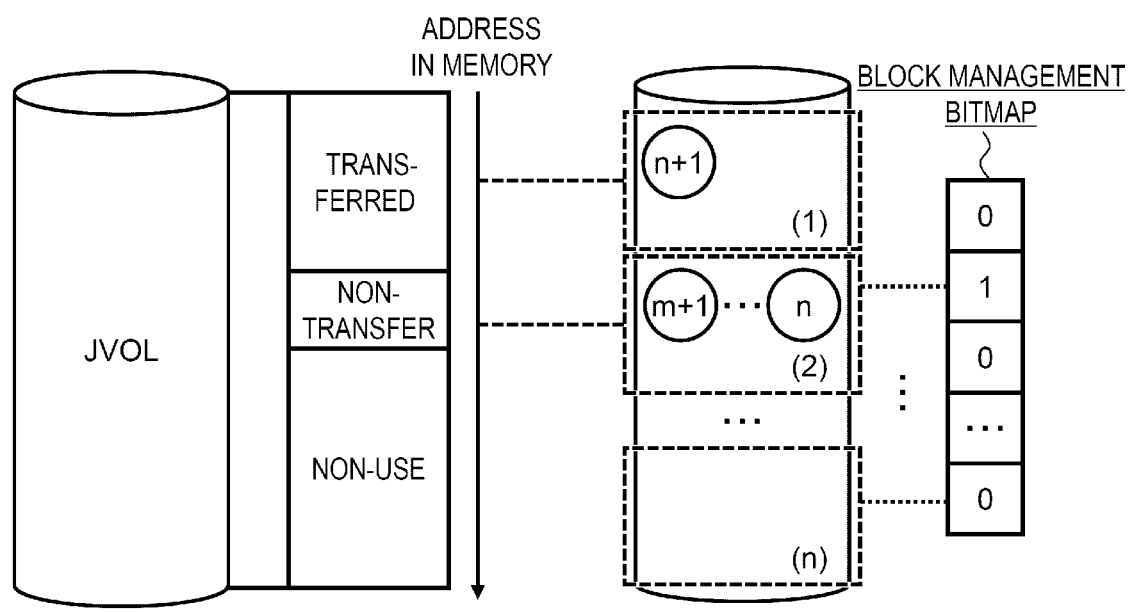
FIG. 5 is a block diagram illustrating a management method of journal data in a journal volume.

A block management bitmap 310 is a bitmap that manages transfer, non-transfer, and non-use of journal data on the journal volume (FIG. 5). The block management bitmap 310 is updated by the bitmap management program 300. A volume management table 312 is a table for managing configuration information of the volume, and is updated by the volume management program 302.

A journal management table 314 is a table for managing configuration information of the journal, and is updated by the journal management program 304. A pair management table 316 is a table for managing configuration information of the pair, and is updated by the pair management program 306.

An apparatus operation information management table 318 is a table of operation information of the CPU and the memory of the storage system, and is updated by the operation information management program 308. A volume operation information management table 320 is a table for managing operation information of the volume, and is updated by the operation information management program 308. An inter-journal operation information management table 322 is a table of operation information between the journals, and is updated by the operation information management program 308. An operation log 324 is a table of a log of an operation performed on the storage system.

Figure 4:
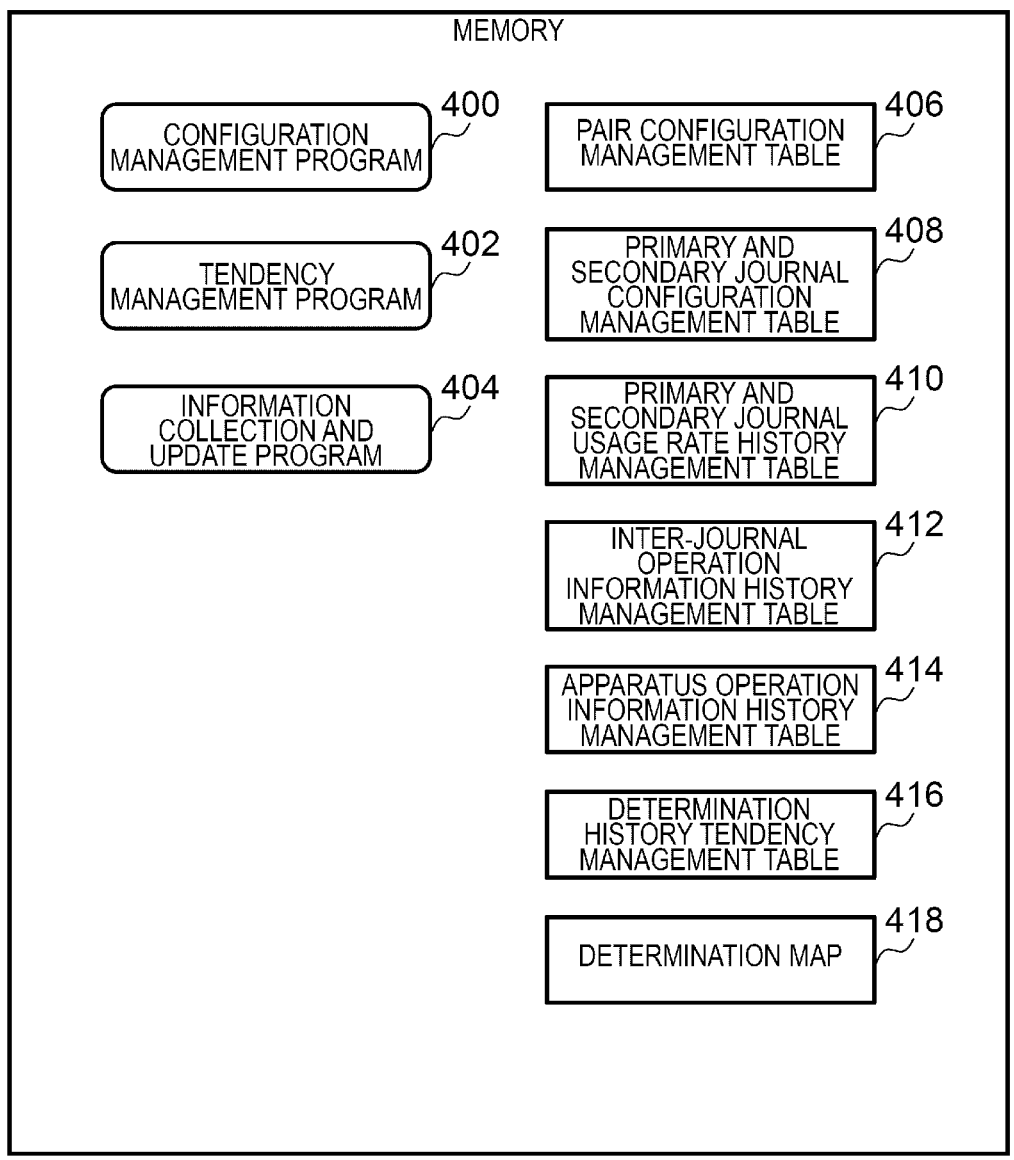
FIG. 4 is a block diagram of a storage structure of a memory of a management computer.

FIG. 4 is a functional block diagram of a storage structure of the memory 132 of the management computer 130. A configuration management program 400 manages configurations of the storage systems 110a and 110b to be managed. A tendency management program 402 manages a tendency of operation information of each of a plurality of resources to be managed of the storage systems 110a and 110b. An information collection and update program 404 collects and updates the configuration information and the operation information from the target storage systems 110a and 110b to be managed.

A pair configuration management table 406 is a table for managing remote copy pair configurations of the storage systems 110a and 110b to be managed, and is updated by the configuration management program 400. A primary and secondary journal configuration management table 408 is a table for managing configurations of the primary journal (PJNL) and the secondary journal (SJNL) of the storage system to be managed, and is updated by the configuration management program 400.

A primary and secondary journal usage rate history management table 410 is a table for managing history tendencies of usage rates of the primary journal (PJNL) and the secondary journal (SJNL) of the storage system to be managed, and is updated by the tendency management program 402. An inter-journal operation information history management table 412 is a table for managing a history of operation information between the primary journal and the secondary journal of the storage system to be managed, and is updated by the tendency management program 402.

An apparatus operation information history management table 414 is a table for managing a history of the apparatus operation information management table 318, and is updated by the tendency management program 402. A determination history tendency management table 416 is a determination table for changing, adjusting, correcting, amending, etc. configurations including attributes, specifications, and applications of the primary and secondary journal volumes, and is updated by the tendency management program 402. A determination map 415 is a control table for the configuration management program 400 to change the configurations of the journal and the journal volume when a plurality of events occur in the resource related to the application of the remote copy. The determination map 415 may be prepared in advance or may be updated as necessary by user input.

FIG. 5 is a block diagram illustrating a management method of the journal data in the journal volume. The journal volume JVOL functions as a buffer for receiving data written to the primary volume and sending the data to the secondary volume.

The journal data (update data and meta data) is sequentially taken out from a head memory address L of the journal volume and transmitted to the secondary storage system 110b. As areas of the journal volume, there are a transferred area where the journal data is transferred to the secondary journal volume, an area where the journal data is stored but not transferred to the secondary journal volume, and an unused area.

The block management bitmap stores a value indicating whether each block of the journal volume is in use or unused. When the corresponding block is in use, a bit value "1" is set, and when the corresponding block is unused, a bit value "0" is set. The journal volume is managed by being divided into a plurality of blocks of a predetermined common fixed size. Each block has a size capable of storing a plurality of pieces of journal data.

The configuration management program 400 of the management computer 130 refers to the block management table 310 based on a tendency of an operation state of a resource that is related to or affects the application of the remote copy to execute expansion or release of a capacity of the journal volume.

The configuration management program 400 releases the transferred area and a part or all of the transferred area of the journal volume from the journal volume to reduce a storage capacity allocated to the journal volume.

FIG. 6A is an example of the volume management table 312. The volume management table 312 includes a volume resource ID, a capacity, and its attribute. The attribute includes a normal volume accessed from the host and a volume used as a journal volume.

FIG. 6B is an example of the journal management table 314. The journal management table 314 includes an ID of a journal resource, an ID (VOL ID) of the journal volume included in the journal, the capacity (JVOL capacity) of the journal volume, status (normal, error), and information on the usage rate of the journal volume.

FIG. 6C illustrates an example of the pair management table 316. The pair management table 316 includes an ID (resource ID) of the remote copy pair, an ID (PVOL ID) of the primary volume included in the pair, an ID (PJNL ID) of the primary journal volume, an ID (SVOL ID) of the secondary volume, an ID (SJNL ID) of the secondary journal volume, a group ID when a plurality of pairs are managed in a group, and status indicating a state of the pair.

The status includes, for example, a pair state in which data of the pair is continuously copied, a suspend state in which copy is suspended, a PFUL state in which the journal volume is likely to overflow, and a PSUE state in which an abnormality occurs due to some kind of error. Since it is assumed in these tables that the IDs of the volume and the journal are globally unique, an ID indicating an apparatus is omitted, but if the IDs of the volume and the journal are unique in the apparatus, information indicating each of primary and secondary apparatus IDs may be included.

FIG. 7A is an example of the volume operation information management table 320, and includes an ID of the volume, information indicating a type of a metric (operation information), a time, and a value of the operation information at each time. The volume operation information management table 320 records values every one minute, but the time interval is not limited thereto.

FIG. 7B is an example of the inter-journal operation information management table 322, and records an ID (PJNL ID) of the journal of the primary site 110a, an ID (SJNLL ID) of the journal of the secondary site 110b, information indicating a type of a metric, and a value at each time are recorded.

FIG. 7C is an example of the apparatus (storage system) operation information management table 318, and indicates IDs of the CPU and the memory, which are the resources of the storage system, a type of a metric, a time, and a value of the metric at the time. A write pending rate of the memory indicates a ratio of data accumulated without being written to the memory when write data increases. The write pending rate is one index indicating that a load of the storage system increases. The metric is not limited to the values described herein. For example, the metric may be a response time of the volume, a drive operation rate for each drive, a cache hit rate of the memory, a CPU, a memory, and a drive operation rate for each node in a storage cluster.

FIG. 8A is an example of the pair configuration management table 406. The pair configuration management table 406 basically includes the same information as the pair management table 316 of the storage system. FIG. 8B illustrates an example of the primary and secondary journal configuration management table 408. The primary and secondary journal configuration management table 408 includes the same information as the journal management table 314 of all the storage systems 110a and 110b to be managed. Basically, the primary and secondary journal configuration management table 408 includes the same column information as the journal management table 314 of the storage system.

FIG. 9 is an example of the operation log 324 executed on the storage system 110a (110b). The operation log may have a plurality of values for a plurality of resources to be operated (for example, an array). A designated parameter is, for example, a value necessary for operation contents such as a size when creating a volume. The operation log may be a list of texts in addition to the table format. Columns (values) to be recorded as the log is not limited to the example in FIG. 9.

The management computer 130 collects the operation information of the resource related to the application of the remote copy from the storage systems 110a and 110b, and creates a history of the operation information as the history management table. The management computer 130 calculates a tendency from the collected operation information history, and determines, based on the tendency, application status of the remote copy, for example, a tendency of the usage rate of the primary journal volume and/or the secondary journal volume (an increasing tendency or a decreasing tendency of the usage rate), and dynamically changes, based on the application status, the capacity of the journal volume according to the application of the remote copy. As a result, the storage capacity allocated to the journal volume can be maintained within an appropriate range during an application period of the remote copy.

FIG. 10A is an example of the primary and secondary journal usage rate history management table 410. The primary and secondary journal usage rate history management table 410 includes a history of the usage rate (journal volume) at each time for each of the plurality of journals PJNL1, PJNL2, SJNL1, and SJNL1 of all the storage systems 110a and 110b, which are managed by the management computer.

The usage rate of the journal volume refers to a total ratio of the untransferred area and the transferred area of the journal data among a total capacity of the journal volume. The usage rate (utilization rate) of each of the journal and the journal volume is an example of the operation information of the resource related to the remote copy.

FIG. 10B is an example of the inter-journal operation information history management table 412. The inter-journal operation information history management table 412 includes a history of a data transfer rate (a load of the network 121) serving as the operation information (the metric) between the journals for each combination of the primary journal (PJNL ID) and the secondary journal (SJNLL ID). The metric is not limited to the values described herein. For example, the metric may be a response time between the journal volumes, and an IO load (IOPS) to the journal volume. The data transfer rate between the plurality of journals is an example of the operation information of the resource related to the remote copy.

FIG. 11 is an example of the determination history tendency management table 416. In FIG. 11, each of the primary journal volume, the primary storage system, the secondary storage system, and a network between the primary journal volume and the secondary journal volume is an example of the resource related to the remote copy.

The determination is for specifying a load tendency (hereinafter, simply referred to as a "tendency") in the operation information of the resource. The tendency is "normal", "performance deterioration", or the like in FIG. 12. The management computer 130 changes the configuration of the journal volume based on the tendency of the operation state for the application of the remote copy of the storage system. Therefore, according to the application status of the remote copy, the management computer 130 can dynamically change the configurations of the primary and secondary journal volumes, and can continuously keep the storage capacity allocated to the journal volume within the appropriate range during the application period of the remote copy.

The determination history tendency table 416 includes an ID (DKC1: primary storage system) of the storage system (DKC), a resource ID of the storage system, and resource operation information (a metric). For the metric, when there is a resource related to the resource ID, a related resource ID is recorded. A tendency value is a value serving as a base for determination and is a value of the operation information, and for example, may be an average of peak values over a certain recent fixed period (for example, one day).

As illustrated in FIG. 11, a CPU utilization rate of the storage system and the write pending rate of the memory are examples of the operation information of the resource related to the remote copy. The operation information of the resource includes at least one of a load of a first storage system, a load of a second storage system, the IO load to the journal volume, the utilization rate of the journal volume, and a load of a network between the first storage system and the second storage system.

FIG. 12 illustrates an example of a determination map 418. The determination map is in a table format. The determination map 418 includes a plurality of combinations of the tendencies of the operation information of the plurality of resources related to the remote copy, and a scenario of handling for expansion or release of the capacity of the journal volume for each of the combinations. "Constant" and "increase" of the IOPS of the PJNLVOL, the load "normal" of the primary DKC (primary storage system) 110a, "normal", "performance deterioration", and "exceed upper limit" of a network state (inter-JNL NW state) between the journals, and the load "normal" and "high load" of the secondary DKC (secondary storage system) 150b are examples of the "tendency" of the operation information.

The determination map 418 includes the tendency of the operation information of each of the plurality of resources. The tendency is determined by the management computer by comparing the "tendency value" illustrated in FIG. 11 with current operation information. The load of the storage system (DKC) is, for example, the CPU utilization rate or a cache write pending rate.

The inter-JNL NW (inter-journal network: 122) state is, for example, a value of the data transfer rate between the primary and secondary journals. The determination map includes application adjustment of the remote copy in accordance with a scenario of a tendency or a development such as whether the usage rates of the primary journal volume and the secondary journal volume increase in the future or decrease based on the plurality of combinations of the tendencies of the operation information. The application adjustment of the remote copy includes a configuration change of the journal volume (the expansion or release of the capacity of the journal volume).

The management computer 130 executes the configuration change of the journal volume according to the determination map. The management computer 130 may handle the configuration change of the journal volume according to the determination map or may execute a logic corresponding to the determination map based on a flowchart.

FIG. 13 is an example of a flowchart for creating the journal volume. It is assumed that the primary volume (PVOL) and the secondary volume (SVOL) are respectively created in the primary and secondary storage systems 110a and 110b. FIG. 13 is executed when the application of the remote copy is started.

The flowchart in FIG. 13 is started based on access from a user to the management computer 130. The user instructs the configuration management program 400 of the management computer 130 to create a remote copy pair (S1300). In response to this, the configuration management program 400 instructs the primary and secondary storage systems 110a and 110b to create a journal volume (S1302).

In response to this, the volume management program 302 of each of the primary and secondary storage systems creates the journal volume (S1304). At this time, the capacity of the journal volume may be a minimum necessary capacity, the same capacity as the volume (PVOL), or set to an appropriate value in advance by the user.

Next, the configuration management program 400 of the management computer 130 instructs the primary and secondary storage systems to create a journal (S1306). In response to this, the journal management program 304 of each of the primary and secondary storage systems creates the journal and registers the journal in the journal management table 314 (S1308). Next, the configuration management program 400 instructs the pair management program 306 of the primary and secondary storage systems to create a remote copy pair (S1310).

Then, the pair management program 306 of the primary and secondary storage systems creates the remote copy pair from the information in the volume management table 312 (FIG. 6A) of the volume (including the journal volume), registers the remote copy pair in the journal management table 314 (FIG. 6B) and the pair management table 316 (FIG. 6C) (S1312), and ends the flowchart.

Figure 14:
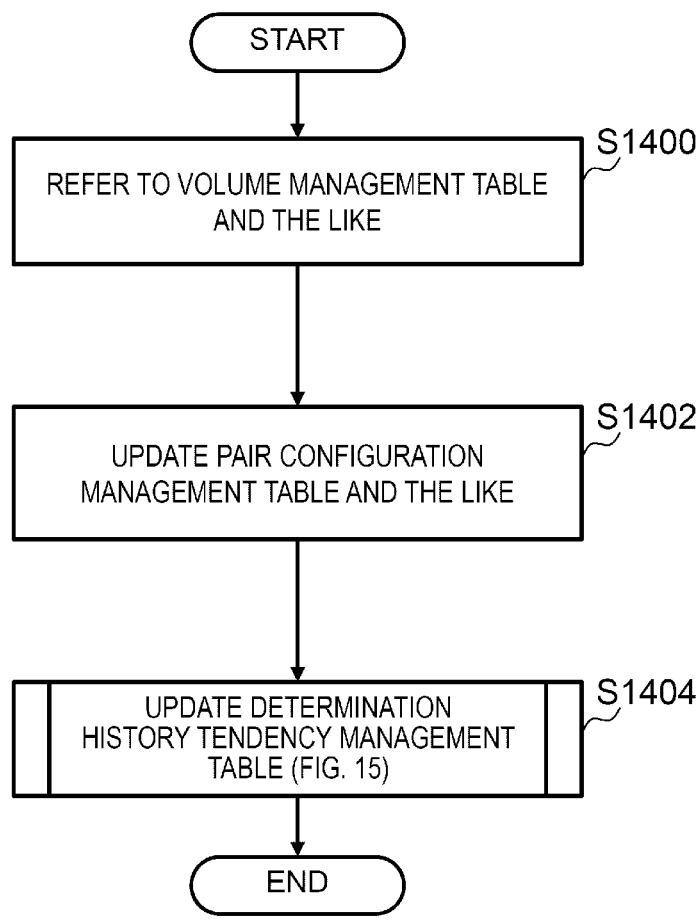
FIG. 14 is a flowchart for updating the determination history tendency management table.

Next, the management computer 130 collects the information from the storage systems 110*a* and 110*b* and updates the previously described tables (FIG. 4). The management computer 130 updates determination history information (the determination history tendency management table 416: FIG. 11) according to a flowchart in FIG. 14 described below. The management computer 130 executes the flowchart in FIG. 14 at predetermined time intervals.

The information collection and update program 404 refers to the volume management table 312, the journal management table 314, the pair management table 316, the volume operation information management table 320, and the inter-journal operation information management table 322 from the primary and secondary storage systems 110*a* and 110*b* (S1400).

Next, the information collection and update program 404 updates the pair configuration management table 406, the primary and secondary journal configuration management table 408, the primary and secondary journal usage rate history management table 410, the primary and secondary journal operation information history management table 412, and the apparatus operation information history management table 414 (S1402). Then, the information collection and update program 404 updates the determination history tendency management table 416 based on a flowchart in FIG. 15 (S1404).

Figure 15:
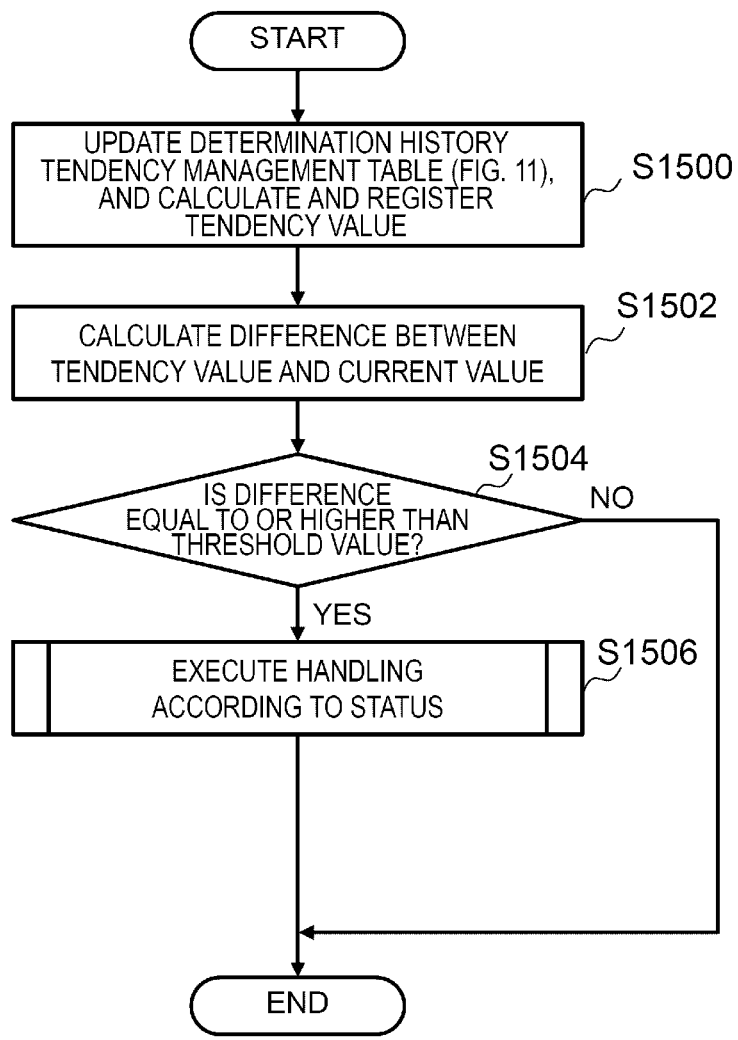
FIG. 15 is a flowchart (continued from FIG. 14) for updating the determination history tendency management table.

FIG. 15 is a flowchart for updating the determination history tendency management table 416 (FIG. 11). The tendency management program 402 updates the determination history tendency management table 416 based on each management table updated based on the flowchart in FIG. 14.

The tendency management program 402 calculates apparatus operation information (the CPU utilization rate, the memory write pending rate, the drive operation rate, and the like) of each of the primary and secondary storage systems, the IOPS of each of the primary and secondary journal volumes, a tendency value of a data transfer amount between the journals, and the like in a past certain period (for example, past one day), and registers in the determination history tendency management table 416 (S1500).

The tendency value may be, for example, an average value of values obtained by excluding maximum and minimum peak values of the metrics (operation information). A reason for excluding the maximum and minimum values is to remove extreme values. The peak value in this case is, for example, a value of the metric in a case where a difference between consecutive times of the operation information is positive.

Next, the tendency management program 402 compares the tendency value (a recorded value) recorded in the determination history tendency management table 416 with the operation information (a current value) calculated this time (S1502). The tendency management program 400 calculates a difference between the recorded value and the current value, compares the difference with a threshold value (S1504), and when there is at least one metric in which the difference exceeds the threshold value, affirms the determination and proceeds to S1506. When the tendency management program 400 denies the determination, assuming that there is no substantial change in the operation information of the resource related to the application of the remote copy, the flow chart is ended without changing the configuration of the journal volume.

As the threshold value, a fixed value (for example, 5% of the tendency value recorded in the management table 416) may be determined in advance, or the user may set a predetermined value each time. The threshold value may change for each operation information (metric) of the resource.

S1504 may be performed as follows. A weight is set for each operation information of each of the plurality resources, and the tendency management program 400 multiplies the difference (S1502) and the weight for each of the plurality of piece of operation information. Then, the tendency management program 400 may add values obtained in this manner to all the operation information and compare a total value with a predetermined value.

The tendency management program 400 can judge a degree of influence given to the change in the configuration of the journal volume for the plurality of pieces of operation information by assigning the weight to each of all pieces of the operation information. Therefore, whether the configuration of the journal volume needs to be changed can be comprehensively determined according to the application of the remote copy.

When a plurality of journal volumes exist in the storage system, the threshold value may be changed for the journal volumes. By changing the threshold value, a timing at which the capacity of the journal volume is changed for each of the journal volumes can be changed.

When the management computer 130 determines whether the capacity of the plurality of journal volumes in the storage system needs to be changed, a priority for the operation information may be changed for each of the plurality of journal volumes.

For example, when there are a plurality of journal volumes, the management computer 130 gives the priority to the CPU utilization rate for the first journal volume to determine to change the configuration of the volume, and gives the priority to the write pending rate of the memory for the second journal volume. In this way, whether the configuration of the volume needs to be changed can be determined according to a difference in the attributes of the journal volumes.

Further, when there are a plurality of journal volumes in which the difference of the tendency values exceeds the threshold value, the tendency management program 400 executes S1506 for the journal volume having a largest X value based on a plurality of pieces of operation information, for example, the priorities of the operation information X, Y, Z (X=CPU utilization rate, Y=IOPS, Z=transfer rate), X (top priority), Y (second priority), and Z (third priority). When there are a plurality of journal volumes having the same X value, the tendency management program 400 compares the Y values of the journal volumes, and executes S1506 for the journal volume having a largest Y value.

Next, the tendency management program 400 executes S1506 for the journal volume having a largest Y value among the remaining plurality of journal volumes, and finally executes S1506 for the journal volume having a largest Z value. In such a priority order, S1506 is executed for all journal volumes.

When the tendency management program 402 affirms in S1504, the tendency management program 402 proceeds to S1506. The configuration management program 400 executes handling for changing the capacity of the journal volume according to the application status of the remote copy (S1506). Details will be described with reference to a flowchart in FIG. 16. Further, after the flowchart is ended after S1506, the tendency management program 402 returns to the flowchart in FIG. 14, and can update the determination history tendency management table 416 in a state after the configuration of the journal volume is changed (S1404).

Figure 16:
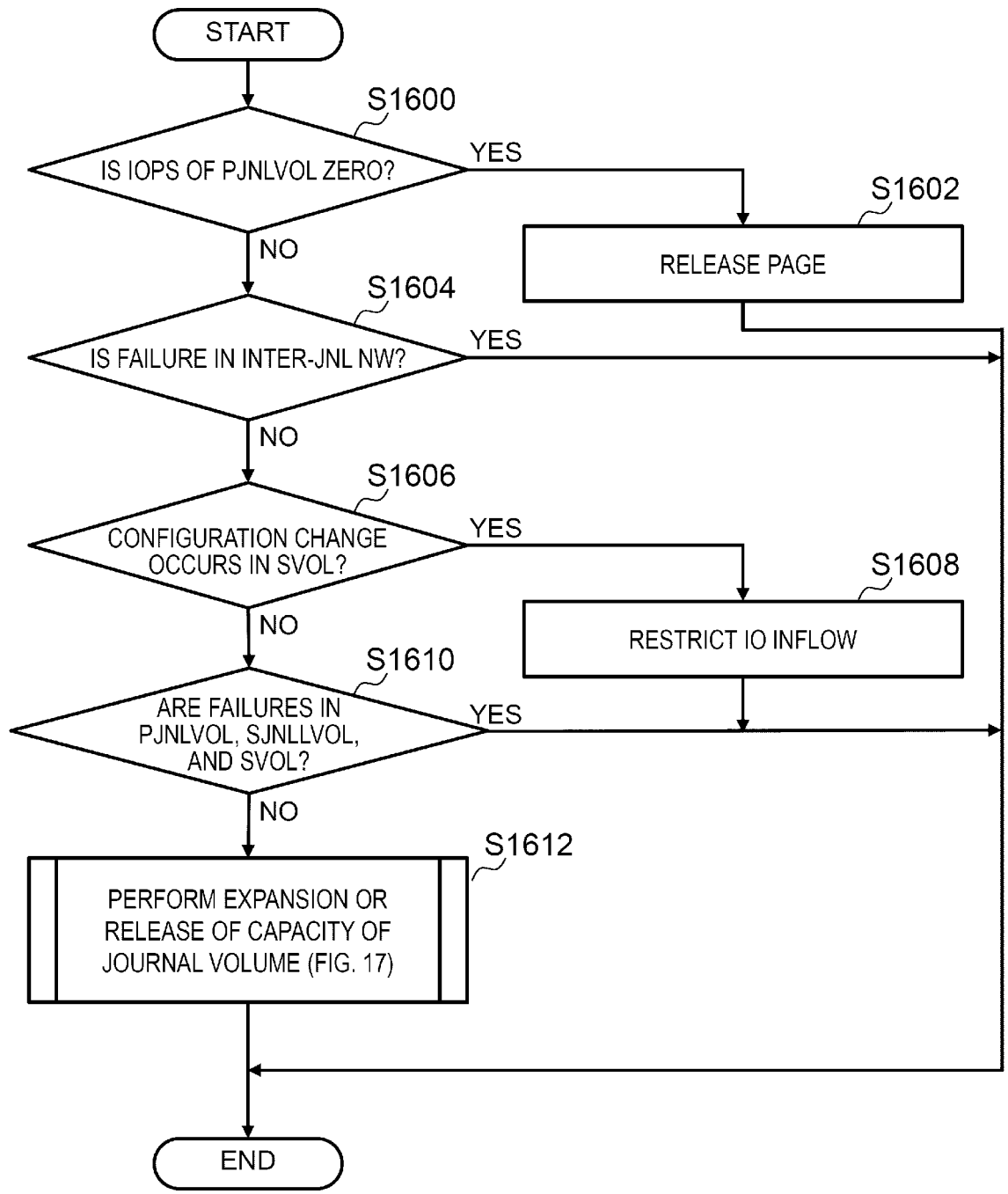
FIG. 16 is a flowchart of handling for changing a capacity of the journal volume according to application status of remote copy.

In response to the instruction of the configuration management program 400, the journal management program 304 executes processing illustrated in the flowchart in FIG. 16 in order to change the configuration of the journal volume (increase or decrease the capacity). The journal management program 304 refers to the volume operation information management table 320 illustrated in FIG. 7A to determine whether the IOPS of the primary journal volume (PJNLVOL) is zero (S1600).

When the journal management program 304 affirms in the step of S1600, the journal management program 304 proceeds to S1602. In S1602, the bitmap management program 300 refers to the bitmap management table (FIG. 5) of the primary journal volume (PJNLVOL), and releases the allocation to the primary journal volume (PJNLVOL) of a page in which the journal data is transferred to the secondary journal volume (SJNLLVOL) among the blocks (pages) of the PJNLVOL.

When the journal management program 304 denies in S1600, the journal management program 304 refers to the inter-journal operation information management table 322 (FIG. 7B) to determine whether there is a failure in the network between the primary journal and the secondary journal (S1604). For example, the configuration management program 400 refers to the volume operation information management table 320 and the inter-journal operation information management table 322, and determines, when the data transfer rate between the journal volumes is zero while the status of the primary and secondary journals is not error and the IOPS of the primary volume (PVOL) is not zero, that there is a network NW failure (S1604/YES).

At this time, since the pair management program 306 changes the status of the remote copy pair in the pair management table 316 (FIG. 6C) from "pair" to "suspend" over time to stop the remote copy, the journal management program 304 does not execute the configuration change such as the capacity release and capacity expansion as in S1602 for the journal volume.

When the journal management program 304 denies in S1604, the journal management program 304 proceeds to S1606, checks the operation log 324 (FIG. 9), and checks whether there is an operation (for example, snapshot creation) in which a most recent operation changes the configuration of the SVOL and impairs performance on the SVOL side.

When the journal management program 304 affirms in S1606 and determines that there is such an operation, the journal management program 304 instructs the volume management program 302 to restrict an IO inflow to the primary volume (PVOL) and ends the flowchart (S1608). At this time, when the configuration change of the SVOL is cancelled, the remote copy is immediately resumed, so that the configuration of the journal volume is not changed.

When the journal management program 304 denies in S1606, the journal management program 304 proceeds to S1610, and refers to the volume operation information management table 320 (FIG. 7A) to check whether there is a failure in at least one of the PJNLVOL, the SUNLLVOL, and the SVOL. When the tendency management program 400 affirms in S1610, the flow chart is ended.

When the primary journal volume (PJNLVOL) fails, since the application of the remote copy is not performed, the journal management program 304 ends the flowchart without performing the processing for the configuration change of the journal volume. When the secondary journal volume (SJNLVOL) fails, since although the usage rate of the primary journal volume (PJNLVOL) increases, the application of the remote copy is not performed due to failure suspension, the journal management program 304 ends the flowchart without performing the processing for the configuration change of the journal volume.

When the secondary volume (SVOL) fails, since although the usage rate of each of the primary journal volume and the secondary journal volume increases, the application of the remote copy is not operated due to failure suspension, the journal management program 304 ends the flowchart.

Figure 17:
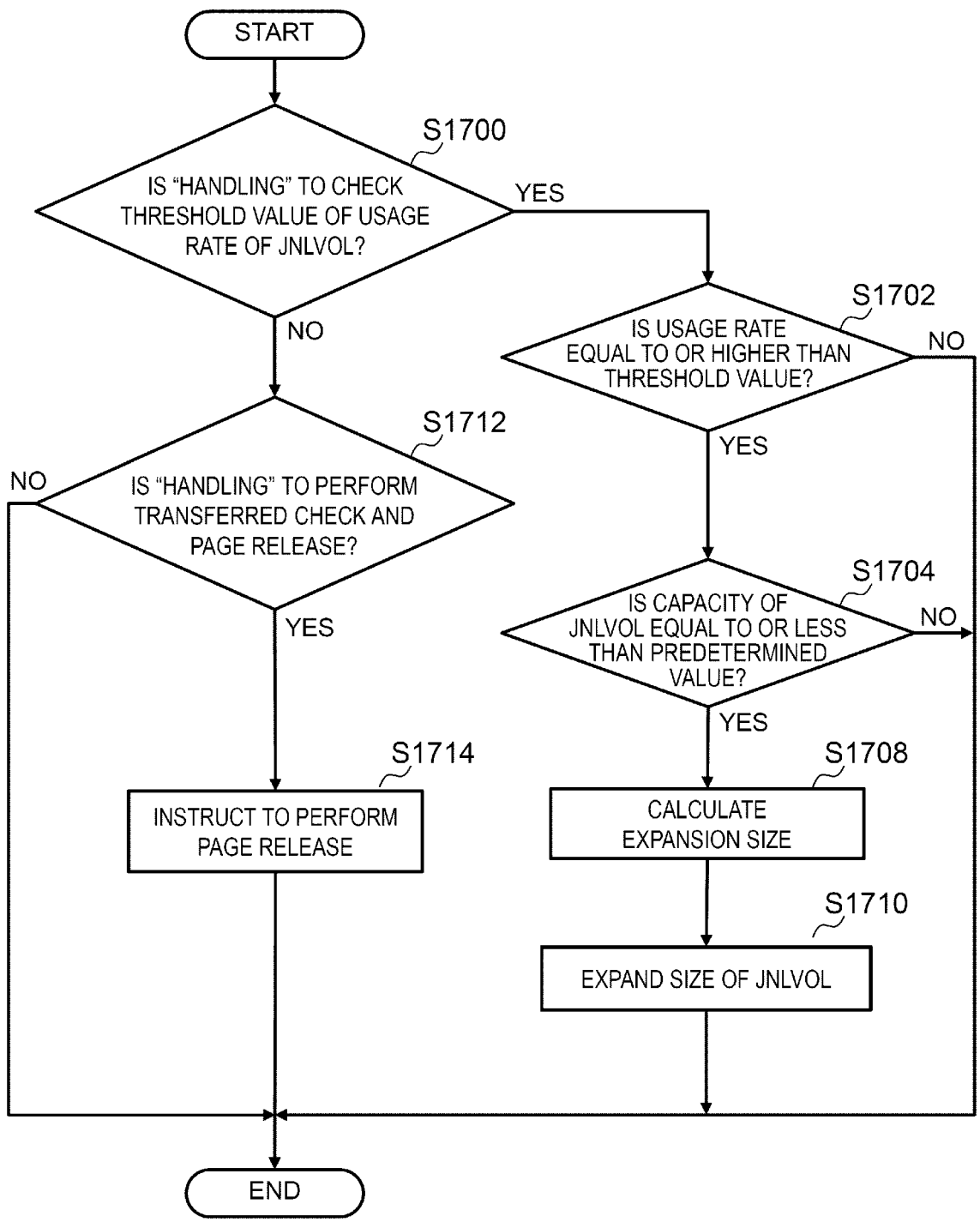
FIG. 17 is a flowchart for expanding or releasing a capacity of primary and secondary journal volumes based on the determination map.

On the other hand, when the journal management program 304 denies in S1610, that is, when all of the PJNLVOL, the JNLVOL, and the SVOL are normal, since the application of the remote copy is continued, the flowchart is ended after the expansion or release of the capacity of the journal volume (S1612: FIG. 17) is performed based on the determination map in FIG. 12.

FIG. 17 is a flowchart for the configuration management program 400 of the management computer 130 to perform the expansion or release of the capacity of the primary and secondary journal volumes based on the determination map in FIG. 12. The configuration management program 400 refers to the previously described management table to read the operation information of the resource, compares the operation information with the tendency values in FIG. 11 to determine the tendencies for the load of the primary journal volume (PJNLVOL IOPS), the load of the primary storage system (primary DKC), the inter-journal network (inter-JNL NW) state, and the load of the secondary storage system (DKC), and collates the plurality of combinations of the tendencies with the determination map in FIG. 12.

In S1700, the configuration management program 400 determines whether the "handling" corresponding to the plurality of combinations of evaluations is to check the threshold value of the usage rate of the journal volume (JNLVOL) according to the map in FIG. 12.

When the configuration management program 400 affirms the determination, that is, when determines that the remote copy is in a state of increasing the usage rate of the journal volume, the configuration management program 400 proceeds to S1702.

The configuration management program 400 checks whether the usage rate of the primary journal volume (PJNLVOL) and/or the secondary journal volume (SJNLVOL) is equal to or higher than the threshold value according to the map in FIG. 12. In FIG. 12, the "P/SJNLVOL" are both the primary journal volume and the secondary journal volume. The threshold value may be determined in advance such as 80%.

When the configuration management program 400 denies in S1702, although the usage rate of the journal volume tends to increase, there is still a margin in storing the journal data in the journal volume and there is no need to expand the capacity of the journal volume, and the flowchart is ended. A reason why the configuration management program 400 performs S1702 is to prevent a limited storage capacity of the storage system from being wasted in the journal volume when the capacity of the journal volume is expanded without limitation.

The configuration management program 400 affirms in S1702, proceeds to S1704, and determines whether the current capacity of the journal volume is equal to or less than a predetermined value, for example, the capacity of the primary volume. A reason why such determination is performed is to prevent a size of the journal volume from becoming unnecessarily large in order to stably apply the remote copy. When the configuration management program 400 denies in S1704, it is determined that the capacity of the journal volume is large and cannot be expanded, and the flowchart is ended.

When the configuration management program 400 affirms in S1704, the configuration management program 400 calculates an expansion size of the capacity of the journal volume. A size to be expanded may be determined from a past tendency, or may be a fixed ratio of the current capacity, or a fixed value. The configuration management program 400 proceeds to S1710, and expands the capacity of the journal volume to the size calculated by the journal management program 304.

When the configuration management program 400 denies in S1700, that is, determines that the remote copy does not tend to increase the usage rate of the journal volume, the configuration management program 400 proceeds to S1712. The configuration management program 400 checks whether the "handling" is to perform transferred check and page release.

When the configuration management program 400 affirms in S1712, that is, determines that the remote copy is in a state of decreasing the usage rate of the journal volume, the configuration management program 400 proceeds to S1714. In S1714, the configuration management program 400 causes the bitmap management program 300 to refer to the bitmap management table (FIG. 5), releases the transferred area from the journal volume, and ends the flowchart.

The configuration management program 400 denies in S1712, that is, determines that the remote copy is not in the state of decreasing the usage rate of the journal volume, and ends the flowchart.

As described above, since the management computer allocates a predetermined storage capacity to each of the primary journal volume and the secondary journal volume during initial design of the remote copy, and after the remote copy is started, executes the allocation of the capacity to the primary journal volume and/or the secondary journal volume according to an application state of the remote copy, even if the remote copy is executed, the storage capacity of the journal volume can be efficiently applied.

Further, in a process of executing a storage system control method in which the management computer 130 manages the remote copy between the first storage system 110*a* that constitutes the primary site and the second storage system 110*b* that constitutes the secondary site, since the management computer dynamically expands or releases the capacity of the journal volume according to the operation information of the resource related to the application of the remote copy, the storage capacity of the journal volume can be appropriately maintained during the application period of the remote copy.

The determination map may be changed between the primary journal volume and the secondary journal volume, that is, contents of the handling for a plurality of combination patterns of the tendencies (an expansion or release pattern of the capacity of the journal volume) may be changed. In addition, when there are a plurality of journal volumes in one storage system, the determination map may be changed for each of the journal volumes. Further, the determination map may be changed according to an application form and the application state of the remote copy.

What is claimed is:

1. A computer system comprising:
   a first storage system constituting a primary site;
   a second storage system constituting a secondary site; and
   a management computer, wherein
   the first storage system includes a primary volume and a primary journal volume,
   the second storage system includes a secondary volume and a secondary journal volume,
   the management computer is configured to:
      manage remote copy in which the primary volume, the primary journal volume, the secondary journal volume, and the secondary volume are paired;
      expand or release a capacity of the primary journal volume and/or the secondary journal volume according to operation information of a resource related to the remote copy;
      obtain a load tendency for each operation information of a plurality of resources related to the remote copy; and
      set a pattern for expanding or releasing the capacity for each combination of the plurality of tendencies.

2. The computer system according to claim 1, wherein the management computer is configured to:
   determine, according to the operation information of the resource, an increasing tendency or a decreasing tendency of a usage rate for each of the primary journal volume and the secondary journal volume;
   expand the capacity according to the determination of the increasing tendency; and
   release the capacity according to the determination of the decreasing tendency.

3. The computer system according to claim 1, wherein the operation information of the resource includes a load of the primary journal volume, a load of the primary storage system, a load of the secondary storage system, and a load of a network between the primary journal volume and the secondary journal volume.

4. The computer system according to claim 1, wherein the management computer is configured to:
   obtain a tendency value of the operation information based on a history of the operation information; and
   obtain the load tendency by comparing a current value with the tendency value of the operation information.

5. The computer system according to claim 4, wherein the management computer is configured to:
   compare the current value of the operation information with the tendency value of the operation information; and
   execute expansion or release of the capacity based on a comparison result.

6. The computer system according to claim 1, wherein the management computer is configured to:
   when an increasing tendency of a usage rate is determined, execute expansion of the capacity when a usage rate of a journal volume is equal to or higher than a threshold value.

7. The computer system according to claim 6, wherein the management computer is configured to:
   execute expansion of a capacity of the journal volume when the capacity is equal to or less than a predetermined value.

8. The computer system according to claim 1, wherein the management computer is configured to:
   allocate a predetermined storage capacity to each of the primary journal volume and the secondary journal during initial design of the remote copy; and
   after the remote copy is started, execute the allocation of the capacity to the primary journal volume and/or the secondary journal volume according to an application state of the remote copy.

9. A computer system comprising:
a first storage system constituting a primary site;
a second storage system constituting a secondary site; and
a management computer, wherein
the first storage system includes a primary volume and a primary journal volume,
the second storage system includes a secondary volume and a secondary journal volume,
the management computer is configured to:
- manage remote copy in which the primary volume, the primary journal volume, the secondary journal volume, and the secondary volume are paired;
- expand or release a capacity of the primary journal volume and/or the secondary journal volume according to operation information of a resource related to the remote copy; and
- when there is an operation of changing a configuration of the secondary volume, neither expansion nor release of the capacity is executed on the primary journal volume and/or the secondary journal volume.

10. A computer system comprising:
a first storage system constituting a primary site;
a second storage system constituting a secondary site; and
a management computer, wherein
the first storage system includes a primary volume and a primary journal volume,
the second storage system includes a secondary volume and a secondary journal volume,
the management computer is configured to:
- manage remote copy in which the primary volume, the primary journal volume, the secondary journal volume, and the secondary volume are paired;
- expand or release a capacity of the primary journal volume and/or the secondary journal volume according to operation information of a resource related to the remote copy; and
- when there is a failure in a network between the primary volume and the secondary volume, neither expansion nor release of the capacity is executed on the primary journal volume and/or the secondary journal volume.

* * * * *